(12) United States Patent
Fox et al.

(10) Patent No.: US 7,757,811 B2
(45) Date of Patent: Jul. 20, 2010

(54) MULTILAYER ARTICLES HAVING ACOUSTICAL ABSORBANCE PROPERTIES AND METHODS OF MAKING AND USING THE SAME

(75) Inventors: Andrew R. Fox, Oakdale, MN (US); David A. Olson, St. Paul, MN (US); Eric M. Moore, Woodbury, MN (US); Michael R. Berrigan, Oakdale, MN (US); David L. Nelson, Eagan, MN (US); Bradley W. Eaton, Woodbury, MN (US); Wayne S. Mahoney, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 18 days.

(21) Appl. No.: 12/088,710

(22) PCT Filed: Oct. 10, 2006

(86) PCT No.: PCT/US2006/039544
§ 371 (c)(1),
(2), (4) Date: Mar. 31, 2008

(87) PCT Pub. No.: WO2007/047263
PCT Pub. Date: Apr. 26, 2007

(65) Prior Publication Data
US 2008/0230309 A1    Sep. 25, 2008

Related U.S. Application Data

(60) Provisional application No. 60/728,230, filed on Oct. 19, 2005.

(51) Int. Cl.
*E04B 1/82* (2006.01)
*E04B 1/84* (2006.01)
*E04B 1/74* (2006.01)

(52) U.S. Cl. .................. 181/291; 181/286; 181/294; 442/351; 442/340

(58) Field of Classification Search ............ 181/291, 181/290, 286, 294, 284; 428/339, 332; 442/351, 442/308, 189, 191, 199, 202, 340, 334
See application file for complete search history.

(56) References Cited

U.S. PATENT DOCUMENTS

| | | | |
|---|---|---|---|
| 4,536,361 | A | 8/1985 | Torobin |
| 4,729,371 | A | 3/1988 | Krueger et al. |
| 6,110,588 | A | 8/2000 | Perez et al. |
| 6,183,670 | B1 | 2/2001 | Torobin et al. |

(Continued)

FOREIGN PATENT DOCUMENTS

DE    199 29 709    12/2000

(Continued)

OTHER PUBLICATIONS

Davies, "The Separation of Airborne Dust and Particles", Proceedings—Institution of Mechanical Engineers, 1952, pp. 185-198.

*Primary Examiner*—Edgardo San Martin
(74) *Attorney, Agent, or Firm*—James A. Baker (57) ABSTRACT

Multilayer articles having acoustical absorbance properties are disclosed. Methods of making and using the multilayer articles are also disclosed.

23 Claims, 3 Drawing Sheets

U.S. PATENT DOCUMENTS

| | | |
|---|---|---|
| 6,315,806 B1 | 11/2001 | Torobin et al. |
| 6,331,343 B1 | 12/2001 | Perez et al. |
| 6,629,340 B1 * | 10/2003 | Dale et al. .................... 28/104 |
| 6,720,058 B1 * | 4/2004 | Weeks et al. .................. 428/94 |
| 6,800,226 B1 | 10/2004 | Gerking |
| 2003/0068481 A1 | 4/2003 | Kody et al. |
| 2006/0137799 A1 * | 6/2006 | Haque et al. ............... 156/62.2 |
| 2008/0026659 A1 * | 1/2008 | Brandner et al. ............ 442/327 |
| 2008/0026661 A1 * | 1/2008 | Fox et al. .................... 442/344 |
| 2008/0057283 A1 * | 3/2008 | Blinkhorn et al. ........ 428/292.1 |
| 2008/0093778 A1 * | 4/2008 | Johnson et al. .............. 264/555 |
| 2008/0160856 A1 * | 7/2008 | Chen et al. .................. 442/341 |
| 2008/0173497 A1 * | 7/2008 | Kalinova et al. ............. 181/290 |

FOREIGN PATENT DOCUMENTS

| | | | |
|---|---|---|---|
| JP | 10203268 A | * | 8/1998 |
| JP | 10251951 A | * | 9/1998 |
| JP | 2001-277953 | | 10/2001 |
| JP | 2006028708 A | * | 2/2006 |
| WO | WO 2005/073441 | | 8/2005 |

* cited by examiner

MULTILAYER ARTICLES HAVING ACOUSTICAL ABSORBANCE PROPERTIES AND METHODS OF MAKING AND USING THE SAME

PRIORITY CLAIM

This application claims priority under 35 U.S.C. §119(e)(1) to provisional U.S. Patent Application No. 60/728,230, filed according to 35 U.S.C. §111(b)(1) on Oct. 19, 2005, the entire contents of which is incorporated herein by reference.

FIELD

The present disclosure relates to multilayer articles having acoustical absorbance properties and methods of making and using such multilayer articles.

BACKGROUND

There is a continued need in the art for articles that provide acoustical properties including sound absorption properties.

SUMMARY

The present disclosure is directed to multilayer articles that provide acoustical properties including sound absorption properties. According to one exemplary embodiment of the present disclosure, the multilayer article comprises a support layer, and a sub-micron fiber layer on the support layer, wherein the sub-micron fiber layer comprises polymeric fibers having a mean fiber diameter of less than 1 micron (μm).

The present disclosure is also directed to methods of making multilayer articles that provide acoustical properties including sound absorption properties. In an exemplary embodiment of the present disclosure, the method comprises (i) forming a plurality of fibers having a mean fiber diameter of less than 1 micron (μm); and (ii) depositing the plurality of fibers onto a substrate so as to form a sub-micron fiber layer on the substrate. The substrate may be a temporary or permanent support layer for the sub-micron fiber layer. The method may further comprise additional steps, such as a point-bonding step, wherein the sub-micron fiber layer is further bonded to a substrate, such as a support layer.

The present disclosure is even further directed to methods of using the multilayer articles. In one exemplary embodiment of the present disclosure, the method comprises a method of absorbing sound in an area, wherein the method comprises the steps of surrounding at least a portion of the area with a sub-micron fiber layer, wherein the sub-micron fiber layer comprises fibers having a mean fiber diameter of less than 1 micron (μm).

These and other features and advantages of the present disclosure will become apparent after a review of the following detailed description of the disclosed embodiments and the appended claims.

BRIEF DESCRIPTION OF THE DRAWINGS

The present disclosure is further described with reference to the appended figures, wherein.

DETAILED DESCRIPTION

The present disclosure is directed to multilayer articles that provide acoustical properties including, but not limited to, sound absorption properties, and sound barrier properties. The multilayer articles (1) have exceptional sound absorption properties; (2) have structural features that enable their use in a variety of applications; and (3) can be manufactured in a cost-effective manner. The present disclosure is also directed to methods of making the multilayer articles, as well as methods of using the multilayer articles in a variety of sound absorbing applications.

Figure 1:
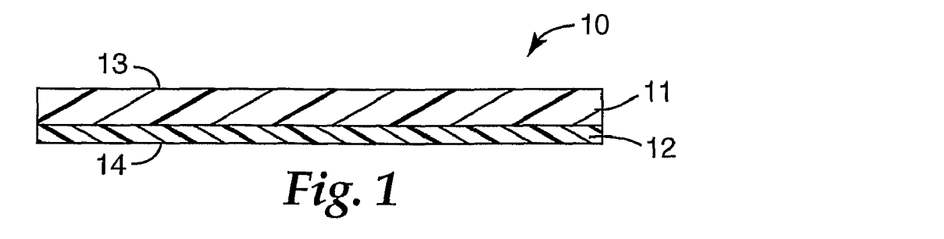
FIG. 1 depicts an exemplary multilayer article of the present disclosure.

An exemplary multilayer article of the present disclosure is shown in FIG. 1. Exemplary multilayer article 10 of FIG. 1 comprises sub-micron fiber layer 11 on support layer 12. Sub-micron fiber layer 11 has an upper surface 13 that may be at least partially covered with one or more additional layers (not shown). Further, support layer 12 has a lower surface 14 opposite sub-micron fiber layer 11 on which can be attached additional layers and/or components (not shown) as described below.

I. Multilayer Articles

The multilayer articles of the present disclosure are designed to provide acoustical properties to a given substrate and/or area. A description of possible components for use in the multilayer articles of the present disclosure, as well as the properties of the resulting multilayer articles is provided below.

The multilayer articles of the present disclosure may comprise one or more of the following components.

A. Multilayer Article Components

The multilayer articles of the present disclosure may comprise one or more of the following components.

1. Sub-Micron Fiber Layer

The multilayer articles of the present disclosure comprise one or more sub-micron fiber layers such as sub-micron fiber layer 11 of exemplary multilayer article 10 shown in FIG. 1. Each sub-micron fiber layer comprises polymeric fibers, wherein the polymeric fibers have a mean fiber diameter of less than 1 micron (μm). In some exemplary embodiments, the sub-micron fiber layer comprises polymeric fibers, wherein the polymeric fibers have a mean fiber diameter ranging from about 0.3 μm to about 0.9 μm. In other exemplary embodiments, sub-micron fiber layer comprises polymeric fibers, wherein the polymeric fibers have a mean fiber diameter ranging from about 0.5 μm to about 0.7 μm.

In the present disclosure, the "mean fiber diameter" of fibers in a given sub-micron fiber layer is determined by producing one or more images of the fiber structure, such as by using a scanning electron microscope; measuring the fiber diameter of clearly visible fibers in the one or more images resulting in a total number of fiber diameters, x; and calculating the average (mean) fiber diameter of the x fiber diameters. Typically, x is greater than about 50, and desirably ranges from about 50 to about 200.

The fibers of the sub-micron fiber layer may comprise one or more polymeric materials. Suitable polymeric materials include, but are not limited to, polyolefins such as polypropylene and polyethylene; polyesters such as polyethylene terephthalate and polybutylene terephthalate; polyamide (Nylon-6 and Nylon-6,6); polyurethanes; polybutene; polylactic acids; polyvinyl alcohol; polyphenylene sulfide; polysulfone; liquid crystalline polymers; polyethylene-co-vinyl acetate; polyacrylonitrile; cyclic polyolefins; or a combination thereof. In one exemplary embodiment, the sub-micron fiber layer comprises a plurality of fibers, wherein the fibers comprise polypropylene fibers.

The sub-micron fiber layer may comprise mono-component fibers comprising any one of the above-mentioned polymers or copolymers. In this embodiment, the mono-component fibers may contain additives as described below, but comprise a single fiber-forming material selected from the above-described polymeric materials. Further, in this embodiment, the mono-component fibers typically comprise at least 75 weight percent of any one of the above-described polymeric materials with up to 25 weight percent of one or more additives. Desirably, the mono-component fibers comprise at least 80 weight percent, more desirably at least 85 weight percent, at least 90 weight percent, at least 95 weight percent, and as much as 100 weight percent of any one of the above-described polymeric materials, wherein all weights are based on a total weight of the fiber.

The sub-micron fiber layer may also comprise multi-component fibers formed from (1) two or more of the above-described polymeric materials and (2) one or more additives as described below. As used herein, the term "multi-component fiber" is used to refer to a fiber formed from two or more polymeric materials. Suitable multi-component fiber configurations include, but are not limited to, a sheath-core configuration, a side-by-side configuration, and an "island-in-the-sea" configuration.

For sub-micron fiber layers formed from multi-component fibers, desirably the multi-component fiber comprises (1) from about 75 to about 99 weight percent of two or more of the above-described polymers and (2) from about 25 to about 1 weight percent of one or more additional fiber-forming materials based on the total weight of the fiber.

Each sub-micron fiber layer may have a basis weight, which varies depending upon the particular end use of the article. Typically, each sub-micron fiber layer has a basis weight of less than about 1000 grams per square meter (gsm). In some embodiments, each sub-micron fiber layer has a basis weight of from about 1.0 gsm to about 500 gsm. In other embodiments, each sub-micron fiber layer has a basis weight of from about 10 gsm to about 150 gsm.

As with the basis weight, each sub-micron fiber layer may have a thickness, which varies depending upon the particular end use of the article. Typically, each sub-micron fiber layer has a thickness of less than about 150 millimeters (mm). In certain embodiments, each sub-micron fiber layer has a thickness of from about 0.1 mm to about 200 mm. In some embodiments, each sub-micron fiber layer has a thickness of from about 0.5 mm to about 100 mm. In other embodiments, each sub-micron fiber layer has a thickness of from about 1.0 mm to about 50 mm.

In most embodiments, the fibers within the sub-micron fiber layer are substantially uniformly distributed within the layer. However, there may be some embodiments wherein it is desirable to have a non-uniform distribution of fibers within the sub-micron fiber layer.

In addition to the fiber-forming materials mentioned above, various additives may be added to the fiber melt and extruded to incorporate the additive into the fiber. Typically, the amount of additives is less than about 25 wt %, desirably, up to about 5.0 wt %, based on a total weight of the fiber. Suitable additives include, but are not limited to, fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, silica, glass, clay, talc, pigments, colorants, glass beads or bubbles, antioxidants, optical brighteners, antimicrobial agents, surfactants, fire retardants, and fluoropolymers. One or more of the above-described additives may be used to reduce the weight and/or cost of the resulting fiber and layer, adjust viscosity, or modify the thermal properties of the fiber or confer a range of physical properties derived from the physical property activity of the additive including electrical, optical, density-related, liquid barrier or adhesive tack related properties.

2. Support Layer

The multilayer articles of the present disclosure may further comprise a support layer such as support layer 12 of exemplary multilayer article 10 shown in FIG. 1. When present, the support layer provides most of the strength of the multilayer article. In some embodiments, the above-described sub-micron fiber layer tends to have very low strength, and can be damaged during normal handling. Attachment of the sub-micron fiber layer to a support layer lends strength to the sub-micron fiber layer, while retaining acoustic properties of the sub-micron fiber layer. A multilayered structure also provides sufficient strength for further processing, which may include, but is not limited to, taking up in roll form, removing from a roll, molding, pleating, folding, stapling, and weaving.

A variety of support layers may be used in the present disclosure. Suitable support layers include, but are not limited to, a non-woven fabric, a woven fabric, a knitted fabric, a foam layer, a film, a paper layer, an adhesive-backed layer, a foil, a mesh, an elastic fabric (i.e., any of the above-described woven, knitted or non-woven fabrics having elastic properties), an apertured web, an adhesive-backed layer, or any combination thereof. In one exemplary embodiment, the support layer comprises a non-woven fabric. Suitable non-woven fabrics include, but are not limited to, a spun-bonded fabric, a melt-blown fabric, a carded web of staple length fibers (i.e., fibers having a fiber length of less than about 100 mm), a needle-punched fabric, a split film web, a hydro-entangled web, an airlaid staple fiber web, or a combination thereof.

The support layer may have a basis weight and thickness depending upon the particular end use of the multilayer article. In some embodiments of the present disclosure, it is desirable for the overall basis weight and/or thickness of the multilayer article to be kept at a minimum level. In other embodiments, an overall minimum basis weight and/or thickness may be required for a given application. In exemplary embodiments, the support layer may have a basis weight of from about 1 gram per square meter (gsm) to about 200 gsm. Typically, the support layer has a basis weight of less than about 100 gsm. In some embodiments, the support layer has a basis weight of from about 5.0 gsm to about 75 gsm. In other embodiments, the support layer has a basis weight of from about 10 gsm to about 50 gsm.

As with the basis weight, the support layer may have a thickness, which varies depending upon the particular end use of the multilayer article. Typically, the support layer has a thickness of less than about 150 millimeters (mm). In some embodiments, the support layer has a thickness of from about 1.0 mm to about 35 mm. In other embodiments, the support layer has a thickness of from about 2.0 mm to about 25 mm.

The above-described sub-micron fiber layer may be permanently or temporarily bonded to a given support layer. In most embodiments of the present disclosure, the sub-micron fiber layer is permanently bonded to the support layer (i.e., the sub-micron fiber layer is attached to the support layer with the intention of being permanently bonded thereto). In some embodiment of the present disclosure, the above-described sub-micron fiber layer is temporarily bonded to (i.e., removable from) a support layer, such as a release liner. In this embodiment, the sub-micron fiber layer may be supported for a desired length of time on a temporary support layer, and optionally further processed on a temporary support layer, and subsequently permanently bonded to a second support layer.

In one exemplary embodiment of the present disclosure, the support layer comprises a spun-bonded fabric comprising polypropylene fibers. In a further exemplary embodiment of the present disclosure, the support layer comprises a carded web of staple length fibers, wherein the staple length fibers comprise a blend of (i) low-melting point or binder fibers and (ii) high-melting point or structural fibers. Typically, the binder fibers have a melting point of at least 10° C. less than a melting point of the structural fibers, although the difference between the melting point of the binder fibers and structural fibers may be greater than 10° C. Suitable binder fibers include, but are not limited to, any of the above-mentioned polymeric fibers. Suitable structural fibers include, but are not limited to, any of the above-mentioned polymeric fibers, as well as inorganic fibers such as ceramic fibers, glass fibers, and metal fibers; and organic fibers such as cellulosic fibers.

In one desired embodiment, the support layer comprises a carded web of staple length fibers, wherein the staple length fibers comprise a blend of (i) about 20 wt % bi-component binder fibers (Invista T254 fibers commercially available from Invista, Inc. (Wichita, Kans.)) (12d×1.5") and (ii) about 80 wt % structural fibers (Invista T293 PET fibers (32d×3")).

As described above, the support layer may comprise one or more layers in combination with one another. In one exemplary embodiment, the support layer comprises a first layer, such as a non-woven fabric or a film, and an adhesive layer on the first layer opposite the sub-micron fiber layer. In this embodiment, the adhesive layer may cover a portion of or the entire outer surface of the first layer. The adhesive may comprise any known adhesive including pressure-sensitive adhesives, heat activatable adhesives, etc. When the adhesive layer comprises a pressure-sensitive adhesive, the multilayer article may further comprise a release liner to provide temporary protection of the pressure-sensitive adhesive.

3. Additional Layers

The multilayer articles of the present disclosure may comprise additional layers in combination with the sub-micron fiber layer, the support layer, or both. One or more additional layers may be present over an outer surface of the sub-micron fiber layer (such as outer surface 13 of sub-micron fiber layer 11 shown in FIG. 1), over an outer surface of the support layer (such as outer surface 14 of support layer 12 shown in FIG. 1), or both.

Suitable additional layers include, but are not limited to, a color-containing layer (e.g., a print layer); any of the above-described support layers; one or more additional sub-micron fiber layers having a distinct average fiber diameter and/or physical composition; one or more secondary fine fiber layers for additional insulation performance (such as a melt-blown web or a fiberglass fabric); foams; layers of particles; foil layers; films; decorative fabric layers; membranes (i.e., films with controlled permeability, such as dialysis membranes, reverse osmosis membranes, etc.); netting; mesh; wiring and tubing networks (i.e., layers of wires for conveying electricity or groups of tubes/pipes for conveying various fluids, such as wiring networks for heating blankets, and tubing networks for coolant flow through cooling blankets); or a combination thereof.

4. Attachment Devices

The multilayer articles of the present disclosure may further comprise one or more attachment devices to enable the multilayer article to be attached to a substrate. As discussed above, an adhesive may be used to attach the multilayer article. In addition to adhesives, other attachment devices may be used. Suitable attachment devices include, but are not limited to, any mechanical fastener such as screws, nails, clips, staples, stitching, thread, hook and loop materials, etc.

The one or more attachment devices may be used to attach the multilayer article to a variety of substrates. Exemplary substrates include, but are not limited to, a vehicle component; an interior of a vehicle (i.e., the passenger compartment, the motor compartment, the trunk, etc.); a wall of a building (i.e., interior wall surface or exterior wall surface); a ceiling of a building (i.e., interior ceiling surface or exterior ceiling surface); a building material for forming a wall or ceiling of a building (e.g., a ceiling tile, wood component, gypsum board, etc.); a room partition; a metal sheet; a glass substrate; a door; a window; a machinery component; an appliance component (i.e., interior appliance surface or exterior appliance surface); a surface of a pipe or hose; a computer or electronic component; a sound recording or reproduction device; a housing or case for an appliance, computer, etc.

II. Methods of Making Multilayer Articles

The present disclosure is also directed to methods of making multilayer articles containing at least one sub-micron fiber layer. In one embodiment of the present disclosure, the method of making a multilayer article comprises (i) forming a plurality of fibers having a mean fiber diameter of less than 1 micron (μm); and (ii) depositing the plurality of fibers onto a support layer or substrate so as to form a sub-micron fiber layer on the support layer or substrate. The method may comprise a step wherein the support layer or substrate is passed through a fiber stream of sub-micron fibers having a mean fiber diameter of less than 1 micron (μm). While passing through the fiber stream, sub-micron fibers are deposited onto the support layer or substrate so as to be temporarily or permanently bonded to the support layer or substrate. Under certain processing conditions, when the fibers are deposited onto the support layer or substrate, the fibers may bond to one another, and further harden while on the support layer or substrate.

In certain exemplary embodiments, the layer of sub-micron fibers may be enmeshed upon the support layer. While not wishing to be bound by any particular theory, the inventor's believe that in some embodiments, there is a physical bond between the layer of the sub-micron fibers and the support layer. In some embodiments, the physical bond may allow for the support to carry the load of further processing steps and handling. The support may also take up any compressive stress that might otherwise result in compression of the sub-micron fibers which could adversely affect the acoustic absorbance performance of the sub-micron fibers.

A number of processes may be used to deposit the sub-micron fibers. Suitable processes include, but are not limited to, processes disclosed in U.S. Pat. No. 4,536,361 (Torobin), U.S. Pat. No. 6,183,670 (Torobin), and DE 19929709 C2 (Gerking. Suitable processes also include an electro-spinning process.

Figure 2:
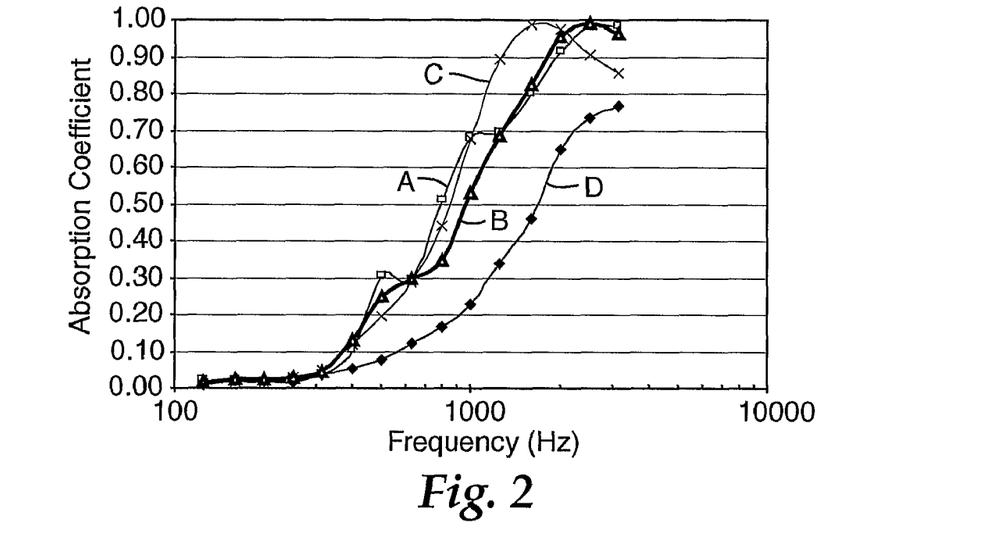
FIG. 2 graphically depicts sound absorption coefficient versus frequency for exemplary multilayer articles of the present disclosure.

The methods of making multilayer articles of the present disclosure may be used to form a sub-micron fiber layer containing fibers formed from any of the above-mentioned polymeric materials. Typically, the sub-micron fiber forming method step involves melt extruding a thermo-formable material at a melt extrusion temperature ranging from about 130° C. to about 350° C. A die assembly and/or coaxial nozzle assembly (see, for example, the Torobin process) comprises a plurality of spinnerets and/or coaxial nozzles through which molten thermo-formable material is extruded. In one exemplary embodiment, the coaxial nozzle assembly comprises a plurality of coaxial nozzles formed into an array so as to extrude multiple streams of fibers onto a support layer or substrate. See, for example, U.S. Pat. No. 4,536,361 (FIG. 1) and U.S. Pat. No. 6,183,670 (FIGS. 1-2).

In addition to a step of forming a sub-micron fiber layer, the methods of making multilayer articles may include one or more of the following process steps:

(1) advancing the multilayer article along a process pathway toward further processing operations;

(2) bringing one or more additional layers into contact with an outer surface of the sub-micron fiber layer and/or the support layer;

(3) calendering the multilayer article;

(4) coating the multilayer article with a surface treatment or other composition (e.g., a fire retardant composition, an adhesive composition, or a print layer);

(5) attaching the multilayer article to a cardboard or plastic tube;

(6) taking-up the multilayer article in the form of a roll;

(7) slitting the multilayer article to form two or more slit rolls;

(8) placing the multilayer article in a mold and molding the multilayer article, (9) applying a release liner over an exposed pressure-sensitive adhesive layer, when present; and (10) attaching the multilayer article to another substrate via an adhesive or any other attachment device including, but not limited to, clips, brackets, bolts/screws, nails, and straps.

III. Methods of Using Multilayer Articles

The multilayer articles of the present disclosure may be used in a variety of applications. The multilayer articles are particularly useful in acoustical applications such as sound absorbing and sound barrier applications. In one exemplary embodiment, the method of using a multilayer article comprises a method of absorbing sound in an area, wherein the method comprises the steps of surrounding at least a portion of the area with a sub-micron fiber layer, wherein the sub-micron fiber layer comprising fibers having a mean fiber diameter of less than 1 micron (μm). In some embodiments, an entire area may be surrounded by a sub-micron fiber layer alone or on a support layer.

The step of surrounding an area may comprise positioning a multilayer article over at least a portion of the area, wherein the multilayer article comprises the sub-micron fiber layer on any of the above-described support layers. In some embodiments, the surrounding step may comprise positioning a multilayer article over at least a portion of the area, wherein the multilayer article comprising the sub-micron fiber layer on a support layer with an additional layer over the sub-micron fiber layer. As described above, suitable additional layers may comprise a color-containing layer (e.g., a print layer); any of the above-described support layers; one or more additional sub-micron fiber layers having a distinct average fiber diameter and/or physical composition; one or more secondary fine fiber layers for additional insulation performance (such as a melt-blown web or a fiberglass fabric); foams; layers of particles; foil layers; films; decorative fabric layers; membranes; netting; mesh; wiring and tubing networks; or a combination thereof.

The surrounding step may further comprise the step of attaching the sub-micron fiber layer or multilayer article to a substrate. Any of the above-described attachment devices may be used to attach the sub-micron fiber layer or multilayer article to a given substrate. Suitable substrates may include, but are not limited to, a wall of a building, a ceiling of a building, a building material for forming a wall or ceiling of a building, a metal sheet, a glass substrate, a door, a window, a vehicle component, a machinery component, or an appliance component.

In other embodiments of the present disclosure, the method of using a multilayer article comprises a method of providing a sound barrier between a sound-generating object and an area. In this exemplary method, the method may comprise the steps of providing a sub-micron fiber layer between the sound-generating object and the area, wherein the sub-micron fiber layer comprising fibers having a mean fiber diameter of less than 1 micron (μm). The sound-generating object may be any object that generates sound including, but not limited to, a vehicle motor, a piece of machinery, an appliance motor or other moving component, an electronic device such as a television, an animal, etc.

The area in either of the above exemplary methods of using a multilayer article may be any area in which sound is to be absorbed and/or restricted from. Suitable areas may include, but are not limited to, an interior of a room; an interior of a vehicle; a piece of machinery; an appliance; a separate sound reduced area of an office or industrial area; a sound recording or reproduction area; the interior of a theatre or concert hall; an anechoic, analytical or experimental room or chamber where sound would be detrimental; and earmuffs or ear covering for isolating protecting ears from noise.

The present disclosure is described above and further illustrated below by way of examples, which are not to be construed in any way as imposing limitations upon the scope of the disclosure. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

In the following Examples, various supports or substrates are prepared using spun-bonding processes or meltblown (i.e. blown microfiber) processes. Suitable processes for preparing such supports are described in U.S. Pat. No. 4,729,371.

Example 1

A polypropylene spun-bonded web manufactured using a spun-bonding process with a nominal 110 gram per square meter (gsm) basis weight was sent to Nanofiber Technology, Inc. (NTI) (Aberdeen, N.C.) for a coating of sub-micron fibers. The spun bonded web was a polypropylene spun-bonded web with a basis weight of 100 gsm, a thickness of 0.045 inches, and an EFD of 18 microns. The polypropylene used was Total Dypro 3860 (Total Petrochemicals, Houston, Tex.).

Varying basis weights of sub-micron polypropylene fibers were deposited onto the spun-bonded web using NTI's process based on U.S. Pat. Nos. 4,536,631, 6,183,670, and 6,315,806 (i.e., the Torobin patents). Resulting samples had 14, 25, and 50 gsm of sub-micron fibers having an average fiber diameter of about 0.56 micron (μm) deposited on the spun-bonded web substrate. The samples are referred to hereafter as Samples A, B, and C respectively. The spun-bonded web alone is referred to hereafter as Sample D.

The sub-micron fiber layer was inherently bonded to the spun-bonded web layer due to both entanglement and thermal bonding. The bonding occurred as the sub-micron fibers were deposited onto the spun-bonded web substrate.

The samples were tested for acoustic absorbance (i.e. acoustical absorption). The tests were conducted in accordance with ASTM standard E 1050, using a 63 mm tube. The samples were placed in the testing tube with a 25 mm gap between the sample and the back wall of the tube. This was done to improve the differentiation of the samples during testing. FIG. 2 shows the results of this testing.

As shown in FIG. 2, the addition of even a small amount of sub-micron fibers greatly increased the acoustic absorption when compared to the spun-bonded web alone.

Example 2

A polypropylene spun-bonded web having a basis weight of 35 gsm was passed under a fiber stream of a nanofiber process as described in Example 1. The spun-bonded web was a polypropylene spun-bonded fiber web with a basis weight of 35 gsm, thickness of 0.018 inches, and an EFD of 20 microns. The polypropylene used was Total Dypro 3860 (Total Petrochemicals, Houston, Tex.).

The spun-bonded web was sent to NTI for coating using their 30" wide process line. Three different coating weights of nanofibers were used, 4.6 gsm, 7.0 gsm, 27.44 gsm, giving total basis weights of 39.6, 42.0 and 62.4 gsm respectively. The nanofibers had an average fiber diameter of about 0.65 micron (μm). The bare spun-bonded web is referred to as Sample E, with the three coated samples referred to as Samples F, G, and H in order of increasing nanofiber basis weight. Sample basis weights, thicknesses, and pressure drops across a given sample are provided below in Table 1.

The four samples were tested in accordance with ASTM standard E 1050, using the 63 mm tube. Each sample was loaded into the testing tube with a 25 mm air gap behind each sample. The acoustic absorption of each web was tested with the results being shown in FIG. 3.

Figure 3:
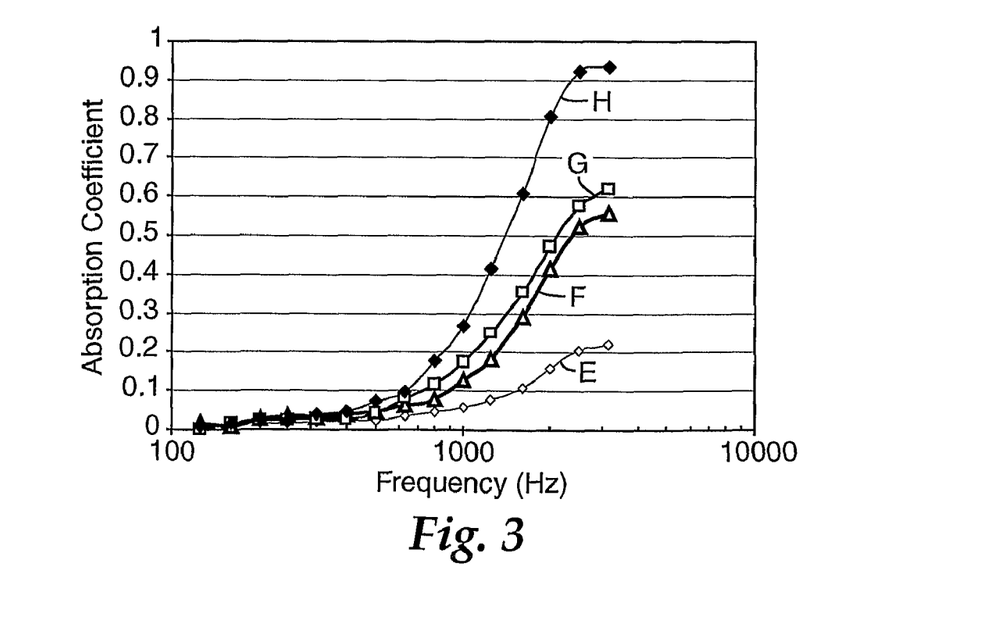
FIG. 3 graphically depicts sound absorption coefficient versus frequency for exemplary multilayer articles of the present disclosure.

As shown in FIG. 3, Samples F, G, and H showed improved acoustic absorption when compared to the spun-bonded web alone (Sample E). Further, as the nanofiber basis weight increased, the acoustic absorption performance increased.

Example 3

A propylene melt-blown fiber web manufactured using a drilled orifice die and having a basis weight of 55 gsm, thickness of 0.040 inches, and an EFD of 8.4, was produced on a 20 inch wide line at 3M Research Center (St. Paul, Minn.) and coated with polypropylene nanofibers from NTI's nanofiber line. The polypropylene used was Total Dypro 3960 (Total Petrochemicals, Houston, Tex.). Three different coating basis weights, 1.8 gsm, 3.0 gsm, and 7.2 gsm, were used to prepare three separate samples. The nanofibers had an average fiber diameter of about 0.77 micron (μm). The bare melt-blown web is referred to as Sample I, while the nanofiber coated samples are identified as Samples J, K, and L in order of increasing nanofiber basis weight. Sample basis weights, thicknesses, and pressure drops across a given sample are provided below in Table 1.

Figure 4:
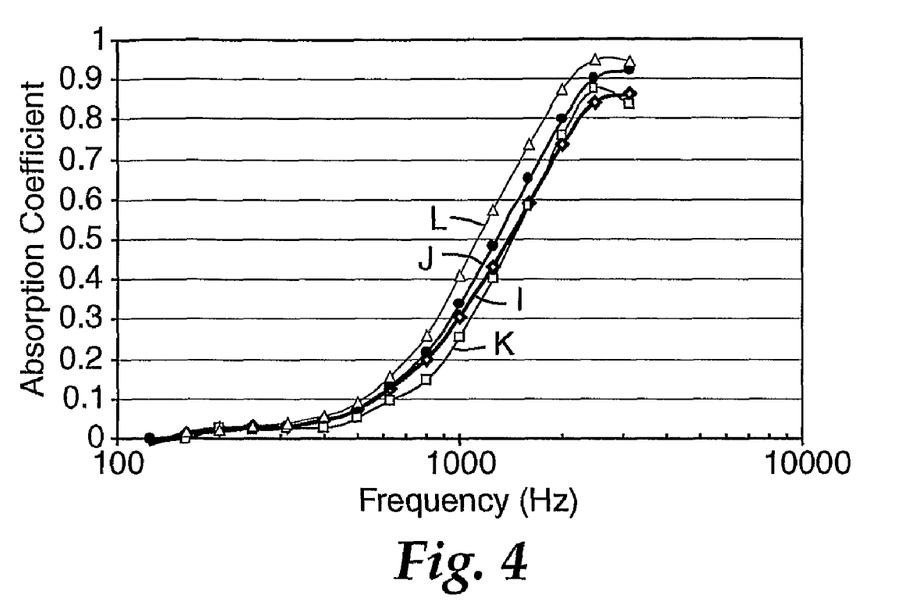
FIG. 4 graphically depicts sound absorption coefficient versus frequency for exemplary multilayer articles of the present disclosure.

The four samples were tested as described in Example 2. The results are shown in FIG. 4.

Example 4

An air-laid (Rando-Webber) non-woven web was sent to Nanofiber Technology, Inc. (NTI) (Aberdeen, N.C.) for a coating of sub-micron fibers. The air-laid web was produced on a 12" wide Rando-Webber machine. The feed fiber composition was 80 wt % Invista T293 fiber (32d×3" PET) and 20 wt % Invista T254 fiber (12d×1.5" bi-component fibers comprising a coPET/PET sheath/core fiber with a sheath melting point of about 110° C. sold under the trade designation CEL-BOND™). The air-laid web had an average basis weight of 42 gsm. NTI deposited varying basis weights of sub-micron polypropylene fibers onto the air-laid web using the process described in Example 1. The samples produced had 30, 41, and 126 gsm of sub-micron fibers having an average fiber diameter of about 0.60 micron (μm) deposited on the air-laid web. The samples are referred to hereafter as Samples M, N, and O respectively. Sample basis weights, thicknesses, and pressure drops across a given sample are provided below in Table 1.

TABLE 1

| Basis Weights and Pressure Drops of Sample Webs of Examples 2, 3, and 4 | | | | |
|---|---|---|---|---|
| Sample | Nanofiber Basis Weight (gsm) | Total Thickness (mils) | ΔP 32 lpm (mm H$_2$0) | Total Basis Weight (gsm) |
| Example 2 | | | | |
| Sample E | 0 | 18 | 0.15 | 35 |
| Sample F | 4.6 | 17 | 0.58 | 39.60 |
| Sample G | 7.0 | 18.5 | 0.67 | 42.03 |
| Sample H | 27.4 | 43 | 3.37 | 62.44 |
| Example 3 | | | | |
| Sample I | 0 | 40 | 1.42 | 55 |
| Sample J | 1.8 | 38.5 | 1.86 | 56.78 |
| Sample K | 3.0 | 41.5 | 1.9 | 58.00 |
| Sample L | 7.2 | 43 | 2.05 | 62.22 |
| Example 4 | | | | |
| Sample M | 30 | 204 | 0.25 | 71.60 |
| Sample N | 41 | 155 | 4 | 82.56 |
| Sample O | 126 | 264 | 9.35 | 167.91 |

Figure 5:
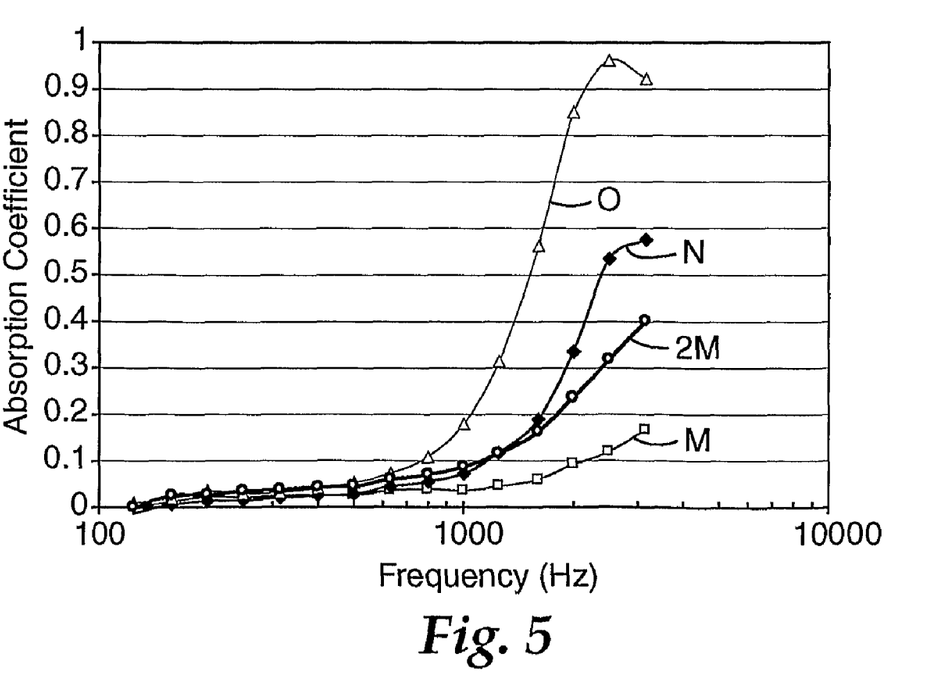
FIG. 5 graphically depicts sound absorption coefficient versus frequency for exemplary multilayer articles of the present disclosure.

The three samples plus two layers of Sample M were tested at 3M Center in accordance with ASTM standard E 1050, using a 63 mm tube. The testing was done with each sample seated against the back of the testing tube. The results of the testing are shown in FIG. 5. Sample F of Example 2 was also examined using scanning electron microscopy to determine Effective Fiber Diameter (EFD) according to the method set forth in Davies, C. N., "The Separation of Airborne Dust and Particles," Institution of Mechanical Engineers, London Proceedings 1B, (1952). The number distribution of Effective Fiber Diameter based on 132 fibers is presented below in Table 2, while distribution statistics are presented in Table 3.

TABLE 2

Number Distribution of Fiber Diameters for Example 2, Sample F

| Fiber Diameter (microns) | Number Count in Range |
|---|---|
| <0.2 | 1 |
| 0.2-0.4 | 24 |
| 0.4-0.6 | 62 |
| 0.6-0.8 | 19 |
| 0.8-1.0 | 10 |
| 1-1.2 | 7 |
| >1.2 | 9 |

TABLE 3

Statistics (All values in microns)

| | |
|---|---|
| Mean Diameter | 0.65 |
| Standard Deviation | 0.43 |
| Minimum Diameter | 0.18 |
| Maximum Diameter | 4.04 |
| Median Diameter | 0.54 |
| Modal Diameter | 0.49 |

Example 5

A staple fiber web was coated with nanofibers from an electro-spinning process. The substrate web is a carded, resin bonded web of polyester fibers manufactured by American Nonwovens (RB 282-57 K/F). The substrate web had a basis weight of 62 grams/meter$^2$. The bare substrate is referred to as Sample P. Sub-micron fibers of polycaprolactone (TONE™ P-787 from Dow Chemical Company) were electro-spun from methyl ethyl ketone solution directly onto the substrate using a conventional needle-based electro-spinning device. Three different basis weights of sub-micron fibers were spun onto the substrate, creating three samples. Sample Q has a sub-micron fiber basis weight of 6.0 grams/meter$^2$. Sample R has a sub-micron fiber basis weight of 11.2 grams/meter$^2$. Sample S has a sub-micron fiber basis weight of 32.1 grams/meter$^2$. The combined basis weights for samples Q through S are 68.0, 73.2, and 94.1 grams/meter$^2$, respectively. The sub-micron fibers had a mean fiber diameter of 0.60 micron ($\mu$m).

Figure 6:
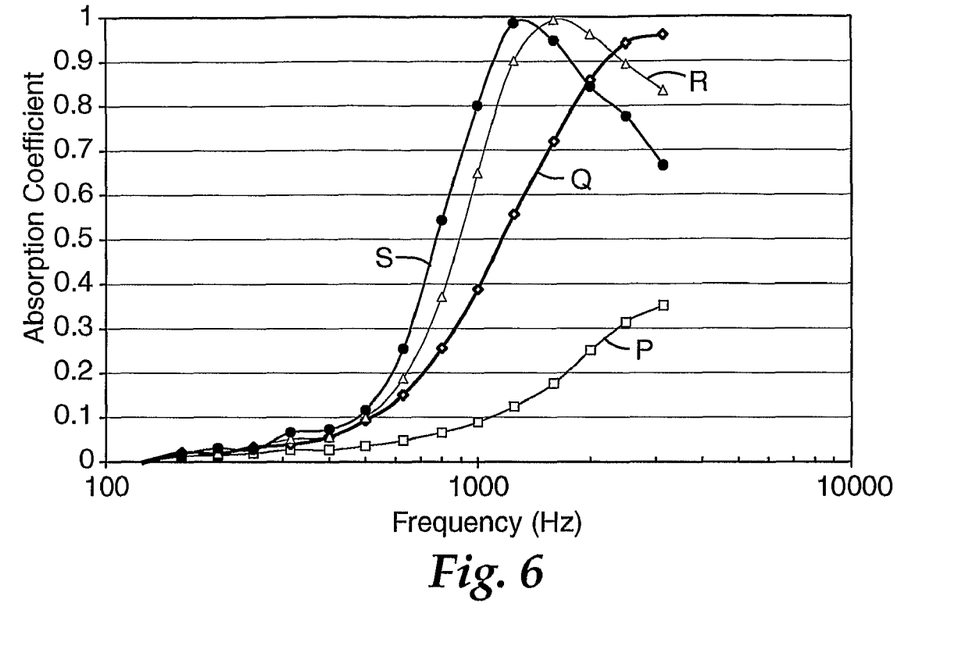
FIG. 6 graphically depicts sound absorption coefficient versus frequency for exemplary multilayer articles of the present disclosure.

Samples P, Q, R, and S were tested at 3M Center in accordance with ASTM standard E 1050, using the 63 mm tube. The testing was done with the back of each sample 25 mm in front of the tube end. The results of these tests are shown in FIG. 6.

Example 6

Sub-micron fibers made of polyurethane was manufactured using the process described in PCT Publication WO2005/073441 by Hak-Yong Kim. The sub-micron fiber web had a basis weight of 14 grams/meter$^2$, and a mean diameter of 0.61 micron ($\mu$m). This web was cold-welded to the carded web described in Example 5. The cold-welding was accomplished using by cutting a single sample from both web simultaneously using a sharp die. The process of cutting the samples resulted in a firm weld forming as the edges of the sample. The bare sub-micron fiber web is referred to as Sample T. The bare carded web is Sample P, as described in Example 5. The welded sample is referred to as Sample U.

Figure 7:
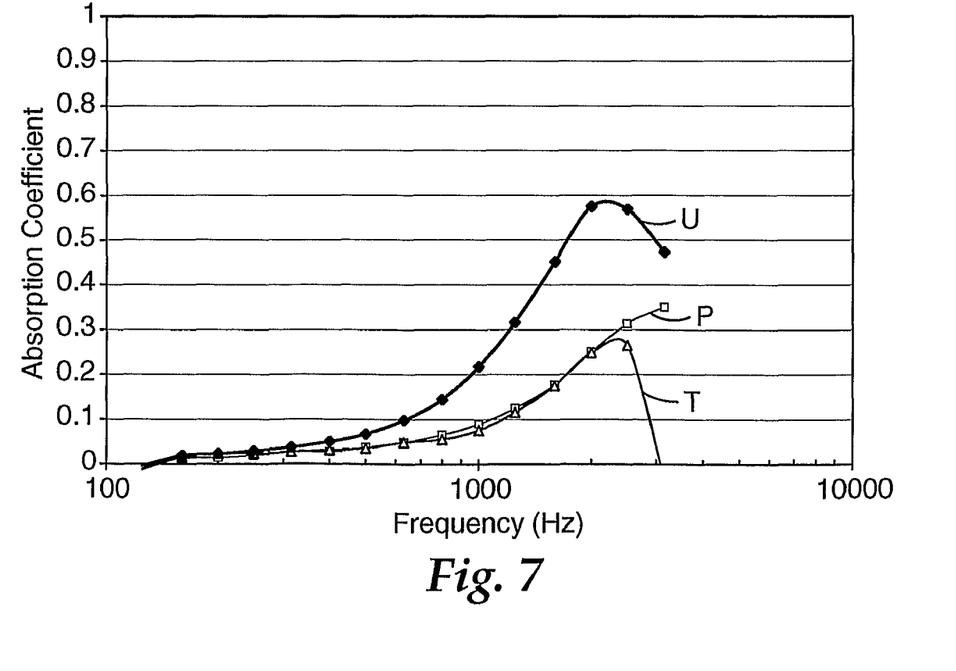
FIG. 7 graphically depicts sound absorption coefficient versus frequency for exemplary multilayer articles of the present disclosure.

The samples were tested in accordance with ASTM standard E 1050, using the 63 mm tube. The testing was done with the back of each sample 25 mm in front of the tube end. The results of these tests are shown in FIG. 7.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present disclosure should be assessed as that of the appended claims and any equivalents thereto.

What is claimed is:

1. A multilayer article comprising:
   a support layer; and
   a sub-micron fiber layer on the support layer, said sub-micron fiber layer comprising polymeric fibers having a median fiber diameter of less than 1 micron ($\mu$m), wherein said polymeric fibers comprise at least 75 weight percent of a polymer selected from polyolefin, polypropylene, polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinylacetate, polyacrylonitrile, cyclic polyolefin, or a combination thereof.

2. The multilayer article of claim 1, wherein said polymeric fibers have a mean fiber diameter ranging from about 0.3 $\mu$m to about 0.9 $\mu$m.

3. The multilayer article of claim 1, wherein said polymeric fibers have a mean fiber diameter ranging from about 0.5 $\mu$m to about 0.7 $\mu$m.

4. The multilayer article of claim 1, wherein said polymeric fibers comprise up to about 99 weight percent of two or more polymers selected from polyolefin, polypropylene, polyethylene, polyester, polyethylene terephthalate, polybutylene terephthalate, polyamide, polyurethane, polybutene, polylactic acid, polyvinyl alcohol, polyphenylene sulfide, polysulfone, liquid crystalline polymer, polyethylene-co-vinylacetate, polyacrylonitrile, or cyclic polyolefin.

5. The multilayer article of claim 1, wherein said polymeric fibers comprise polyolefin fibers.

6. The multilayer article of claim 1, wherein said polymeric fibers are uniformly distributed within the sub-micron fiber layer.

7. The multilayer article of claim 1, wherein said support layer comprises a non-woven fabric, a woven fabric, a knitted fabric, a foam layer, a film, a paper layer, an adhesive-backed layer, or a combination thereof.

8. The multilayer article of claim 1, wherein said support layer comprises a spun-bonded fabric, a meltblown fabric, a carded web of staple length fibers, or a combination thereof.

9. The multilayer article of claim 1, wherein said support layer comprises a web of bonded staple fibers, where said support layer is bonded using thermal bonding, cold-welding, adhesive bonding, powdered binder, hydroentangling, electro-spinning, needlepunching, calendering, or a combination thereof.

10. The multilayer article of claim 1, further comprising an adhesive layer on the support layer opposite the sub-micron fiber layer.

11. The multilayer article of claim 1, further comprising an additional layer over the sub-micron fiber layer.

12. The multilayer article of claim 11, wherein said additional layer comprises a color-containing layer, a non-woven fabric, a woven fabric, a knitted fabric, a foam layer, a film, a paper layer, a layer of particles, a foil layer, a decorative fabric layer, a membrane, a netting, a mesh, a wiring or tubing network; or a combination thereof.

13. The multilayer article of claim 1 attached to a substrate, said substrate comprising a wall of a building, a ceiling of a building, a building material for forming a wall or ceiling of a building, a metal sheet, a glass substrate, a door, a window, a vehicle component, a machinery component, or an appliance component.

14. A method of absorbing sound in an area, said method comprising the steps of:
   surrounding at least a portion of the area with a sub-micron fiber layer, said sub-micron fiber layer comprising polymeric fibers having a median fiber diameter of less than 1 micron (μm), wherein said polymeric fibers comprise at least 75 weight percent of a polymer selected from polyolefin, polypropylene, polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinylacetate, polyacrylonitrile, cyclic polyolefin, or a combination thereof.

15. The method of claim 14, wherein the area comprises an interior of a room; an interior of a vehicle; a piece of machinery; an appliance; a separate sound reduced area of an office or industrial area; a sound recording or reproduction area, an interior of a theatre or concert hall; an anechoic, analytical or experimental room or chamber where sound would be detrimental; earmuffs or ear covering for isolating protecting ears from noise.

16. The method of claim 14, wherein the surrounding step comprises positioning a multilayer article over at least a portion of the area, said multilayer article comprising the sub-micron fiber layer on a support layer.

17. The method of claim 16, wherein said support layer comprises a non-woven fabric, a woven fabric, a knitted fabric, a foam layer, a film, a paper layer, an adhesive-backed layer, or a combination thereof.

18. The method of claim 16, wherein the surrounding step comprises positioning a multilayer article over at least a portion of the area, said multilayer article comprising the sub-micron fiber layer on a support layer with an additional layer over the sub-micron fiber layer.

19. The method of claim 18, wherein said additional layer comprises a color-containing layer, a non-woven fabric, a woven fabric, a knitted fabric, a foam layer, a film, a paper layer, a layer of particles, a foil layer, a decorative fabric layer, a membrane, a netting, a mesh, a wiring or tubing network; or a combination thereof.

20. The method of claim 14, wherein the surrounding step comprises attaching the sub-micron fiber layer to a substrate, said substrate comprising a wall of a building, a ceiling of a building, a building material for forming a wall or ceiling of a building, a metal sheet, a glass substrate, a door, a window, a vehicle component, a machinery component, or an appliance component.

21. A method of providing a sound barrier between a sound-generating object and an area, said method comprising the steps of:
   providing a sub-micron fiber layer between the sound-generating object and the area, wherein the sub-micron fiber layer comprising fibers having a median fiber diameter of less than 1 micron (μm), said sub-micron fiber layer comprising polymeric fibers having a median fiber diameter of less than 1 micron (μm), wherein said polymeric fibers comprise at least 75 weight percent of a polymer selected from polyolefin, polypropylene, polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co- vinylacetate, polyacrylonitrile, cyclic polyolefin, or a combination thereof.

22. The method of claim 21, wherein the sound-generating object comprises a vehicle motor, a piece of machinery, an appliance motor or other moving appliance component, an electronic device, a television, an animal, or a combination thereof.

23. The method of claim 21, wherein the area comprises an interior of a room; an interior of a vehicle; a piece of machinery; an appliance; a separate sound reduced area of an office or industrial area; a sound recording or reproduction area, an interior of a theatre or concert hall; an anechoic, analytical or experimental room or chamber where sound would be detrimental; earmuffs or ear covering for isolating protecting ears from noise.

* * * * *